US007445194B2

(12) United States Patent
Weldon et al.

(10) Patent No.: US 7,445,194 B2
(45) Date of Patent: Nov. 4, 2008

(54) BELLOWS FOR IDLE AIR CONTROL VALVE OF VEHICLE

(75) Inventors: Craig Andrew Weldon, Chatham (CA); Albin Lootvoet, Brussels (BE)

(73) Assignee: Continental Automotive Canada, Inc., Chatham Ontario (CA)

( * ) Notice: Subject to any disclaimer, the term of this patent is extended or adjusted under 35 U.S.C. 154(b) by 0 days.

(21) Appl. No.: 11/898,964

(22) Filed: Sep. 18, 2007

(65) Prior Publication Data

US 2008/0066717 A1 Mar. 20, 2008

Related U.S. Application Data

(60) Provisional application No. 60/826,118, filed on Sep. 19, 2006.

(51) Int. Cl.
*F16K 41/10* (2006.01)

(52) U.S. Cl. .............................. 251/335.3; 123/339.14; 123/339.26; 123/339.27; 123/339.1

(58) Field of Classification Search .............. 123/339.1, 123/339.14, 339.26, 339.27; 251/335.3
See application file for complete search history.

(56) References Cited

U.S. PATENT DOCUMENTS 4,212,272 A * 7/1980 Hawk .................... 123/339.25
4,232,695 A * 11/1980 Roberge ........................ 137/1
4,453,700 A * 6/1984 Otsuki et al. ........... 251/129.15
4,580,536 A * 4/1986 Takao et al. ............ 123/339.22
5,243,941 A * 9/1993 Hisanaga et al. ....... 123/339.13
5,671,903 A * 9/1997 Homma et al. ................ 251/69
6,213,106 B1 * 4/2001 H.ang.kansson ......... 123/568.2
6,311,950 B1 * 11/2001 Kappel et al. .......... 251/129.06
7,066,399 B2 * 6/2006 Hohl ....................... 239/102.2
2006/0185652 A1 * 8/2006 Tsuge et al. ................ 123/519

* cited by examiner

*Primary Examiner*—Erick Solis

(57) ABSTRACT

An idle air control valve for a vehicle includes a housing (21), a motor (32) disposed in the housing, a shaft (29) associated with the motor, and a bellows assembly (30) including a bellows structure (10) having a first end defining a base (14), a second, opened end (16), and a bellows (18) between the first and second ends. An annular rim member (28) is associated with the second opened end. A pintle (24) has surfaces defining an annular groove (26) therein. The annular rim member (28) is received, in press-fit engagement, in the annular groove (26). The base (14) is in press-fit engagement with a recess (22) in the housing and the pintle (24) is coupled with an end of the shaft, such that the bellows structure together with the pintle surround the shaft and provide a barrier substantially preventing contaminants from entering the motor.

19 Claims, 2 Drawing Sheets

BELLOWS FOR IDLE AIR CONTROL VALVE OF VEHICLE

This application claims the benefit of the earlier filing date of U.S. Provisional Application No. 60/826,118, filed on Sep. 19, 2006, which is hereby incorporated by reference into this specification.

FIELD OF THE INVENTION

The invention relates to idle air control valves (IACV) for vehicles and, more particularly, to reducing contamination exposure of an IACV.

BACKGROUND OF THE INVENTION

The Idle Air Control Valve (IACV) is a digital linear actuator (DLA) which accurately controls throttle airflow in an engine system. The need for using an IACV is that vehicle pollution emission control regulations require more precise air/fuel ratios and thus cleaner tailpipe emissions. The IACV is an automotive grade can-stack style stepper motor.

The vehicle environment, for which the IACV is used, can be extreme from the cold temperatures of the artic, to hot dusty deserts, to rain soaked jungles. Under normal vehicle driving conditions, the automotive intake manifold air filtration system is sufficient to protect the IACV from contamination. In the extreme vehicle applications, the IACV can be exposed to the following contamination; dust, moisture, fuel, EGR hot gas, carburetor cleaners, etc. The presence of contaminates in the IACV can lead to reduced component life and subsequent customer complaints or warranty returns.

Currently, there are two components which can be used as barriers to reduce the contamination exposure of the IACV; the grime shield or cover bellows. A grime shield is a metallic cylinder which shrouds a grease covered shaft of the IACV. It can reduce particulate contact with the shaft grease, but is not a barrier that can exclude contaminants. With regard to bellows, there are two styles that are used in current production to reduce the contamination exposure of the IACV. A first type of bellows is used with an IACV in manifold applications and a second type of bellows is used in non-manifold DLA applications for environmental splash protection. Both types of bellows are effective but have shortcomings.

The first type of bellows can be assembled into an IACV. The geometry and rubber material chosen is typically such that the bellows retains its dimensions when exposed to manifold vacuum. One end of the bellows has a press fit insertion into a housing nose. The opposite end of the bellows fits over a skirted cap-nut or pintle, which then requires two O-rings as a radial compression. This is not a proper use of an O-ring. Besides the manufacturing difficulties of stretching the O-ring over the cap nut diameter, the O-ring has potential to tear or crack. Over time, the O-ring could then harden or eventually break-off allowing the bellows to detach from the cap nut. In addition, secondary radial retention components such as springs or clips are required to secure the cap-nut to the bellows.

The second type of bellows can be assembled into a DLA. The geometry and rubber material chosen for this type of bellows serves as a hermetic barrier. Exposing the bellows to manifold vacuum will invert the bellows and thus change it dimensionally. Because of the soft rubber material, one end of the bellows must be glued to a housing nose. This assembly process is difficult and a messy operation.

There is a need to provide an improved bellows for an IACV.

SUMMARY OF THE INVENTION

An object of the invention is to fulfill the need referred to above. In accordance with the principles of the present invention, this objective is obtained by providing an idle air control valve for a vehicle. The idle air control valve includes a housing, a motor disposed in the housing, a shaft associated with the motor such that operation of the motor causes linear motion of the shaft, and a bellows assembly. The bellows assembly includes a bellows structure having a first end defining a base, a second, opened end, and a bellows between the first and second ends. The bellows structure includes an annular rim member associated with the second opened end. A pintle has surfaces defining an annular groove therein. The annular rim member is received, in press-fit engagement, in the annular groove, thereby coupling the bellows structure with the pintle. The base is in press-fit engagement with a recess in the housing and the pintle is coupled with an end of the shaft, with the bellows structure together with the pintle surrounding the shaft and providing a barrier substantially preventing contaminants from entering the motor.

In accordance with another aspect of the invention, a bellows assembly for an idle air control valve of a vehicle includes a bellows structure having a first end defining a base, a second, opened end, and a bellows between the first and second ends. The bellows structure includes an annular rim member associated with the second opened end thereof. A pintle is provided that has surfaces defining an annular groove therein. The annular rim member of the bellows structure is received in the annular groove thereby coupling the bellows structure with the pintle.

In accordance with yet another aspect of the invention, a method of providing a contaminant barrier for an idle air control valve of a vehicle is provided. The idle air control valve includes a housing, a motor disposed in the housing, a shaft associated with the motor such that operation of the motor causes linear motion of the shaft. The method provides a bellows structure having a first end defining a base, a second, opened end, and a bellows between the first and second ends. The bellows structure includes an annular rim member associated with the second opened end thereof. A pintle is provided that has surfaces defining an annular groove therein. The second end of the bellows structure is slid over a portion of the pintle so that the annular rim member of the bellows structure is received, in press-fit engagement, in the annular groove, thereby coupling the bellows structure with the pintle. The pintle is coupled to an end of the shaft. The base of the bellows structure is press-fit into a recess in the housing, with the bellows together with the pintle surrounding the shaft and providing a barrier substantially preventing contaminants from entering the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
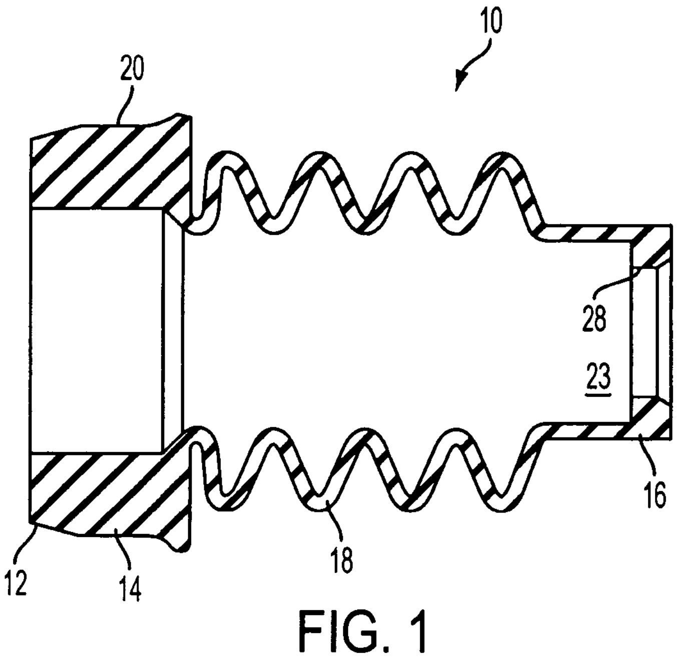
FIG. 1 is an enlarged sectional view of a bellows structure for use in an IACV in accordance with an embodiment of the invention.
Figure 3:
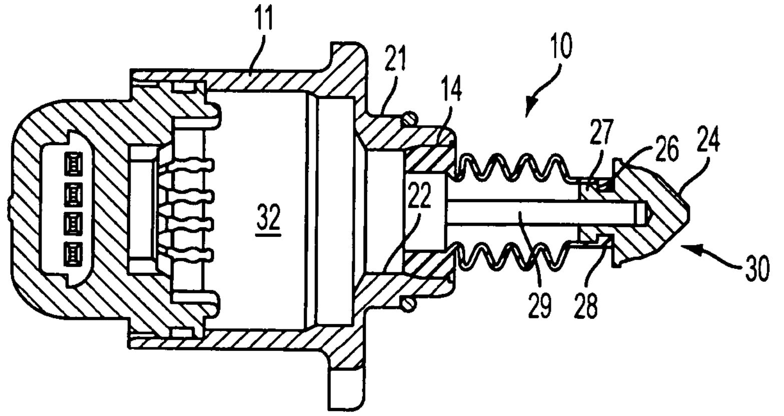
FIG. 3 is a sectional view of an IACV including the bellows structure of FIG. 1 and the pintle of FIG. 2.

With reference to FIG. 1, a bellows structure, generally indicated at 10, is shown in accordance with the principles of an embodiment of the invention. As shown in FIG. 3, the bellows structure 10 is constructed and arranged to be coupled with a conventional idle air control valve (IACV) 11 for a vehicle. The bellows structure 10 includes a first end 12 defining a base 14, a second, opened end 16, and a bellows 18 between the first and second ends. The base 14 has a periphery 20 that is constructed and arranged to be in press-fit engagement with a recess 22 of a housing 21 of the IACV 11, such that no secondary gluing operation is needed to couple the bellows structure 10 to the IACV 11. The geometry of the bellows 18 prevents inversion under manifold vacuum. The bellows structure 10 is preferably of epichlorohydrin material, having a durometer of about 70 and capable of handling a vehicle temperature range of −40° C. to 125° C. Other materials that are suitable for a vehicle environment can be used for the bellows structure 10. The rubber material for the bellows structure 10 is durable, yet chemically inert to environmental degradation. The bellows 18 can be of any suitable shape, such as conical or cylindrical.

Figure 2:
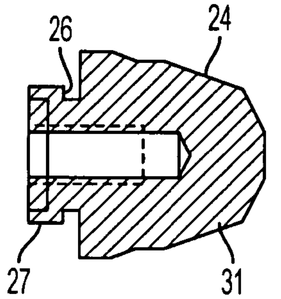
FIG. 2 is an enlarged sectional view of a pintle for attachment to the bellows structure of FIG. 1.

With reference to FIGS. 2 and 3, a pintle 24 is provided to close the opened end 16 of the bellows structure 10. The pintle 24 includes surfaces defining an annular groove 26 therein. The bellows structure 10 includes annular rim member 28, associated with the second opened end 16, which is received (in press-fit engagement) in the groove 26 to retain the pintle 24 to the bellows structure 10. Thus, a first portion 27 of the pintle 24 is received within an internal portion 23 of the bellows structure 10, with a second portion 31 of the pintle 24 extending outside of the internal portion 23 of the bellows structure 10. Assembly is easily performed by simply sliding the annular rim member 28 over the first portion 27 of the pintle 24.

It can be appreciated that no O-rings or secondary radial retention components are needed to secure the pintle 24 to the bellows structure 10. The compression seals of the bellows structure 10 with respect to the housing 21 and pintle 24 are not rigid which allows pressure equalization.

The pintle 24 is coupled with a shaft 29 of the motor 32 of the IACV 11 (FIG. 3). The IACV 11 is preferably of the automotive grade can-stack style stepper motor of the type disclosed in co-pending application Ser. No. 11/882,614, the contents of which is hereby incorporated by reference into this specification.

The bellows structure 10 with pintle 24 attached defines a bellows assembly, generally indicated at 30 in FIG. 3. Thus, the bellows together with the pintle 24 surround the shaft 29 and thus protects the internal components of the IACV from contamination.

Figure 4:
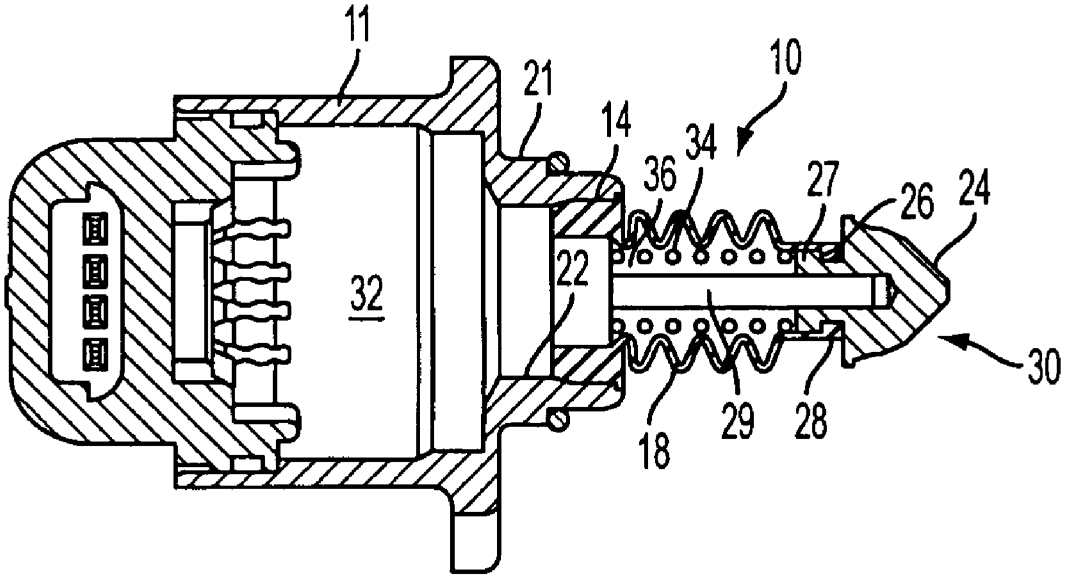
FIG. 4 is a sectional view of an IACV including the bellows structure of FIG. 1 and the pintle of FIG. 2, showing a coil spring biasing the pintle.

FIG. 4 shows another embodiment of a bellows assembly 30' coupled with a shaft 29 of a motor 32 of an IACV 11. This embodiment is similar to that of FIG. 3, however, a coil spring 34 is provided as part of the assembly 30'. The coil spring 34 biases the pintle 24 in the extended position. Preferably, the bellows 18 defines a generally cylindrical interior space 36 to receive the cylindrical coil spring 34.

Some advantages of the embodiments are:

1. Press fit/interference of bellows structure 10 into the housing 21, no secondary adhesive/gluing operation required.
2. Press fit/interference into the pintle groove 26, no secondary radial retention components or secondary adhesive/gluing operation required.
3. Sliding fit of the bellows structure 10 over the pintle shoulder 27, manufacturing assembly improvement.
4. Bellows geometry which prevents inversion under manifold vacuum when IACV is use in the throttle body.
5. Bellows geometry which allows use of internal coil spring 34.
6. Compression seals to housing 21 and pintle groove 26 are not rigid (e.g., are not glued) which allow pressure equalization.
7. Rubber material for bellows structure 10 that is durable yet chemically inert to environmental degradation.
8. Rubber material for bellows structure 10 that will remain flexible below freezing temperature. The IACV may loose functionality when the bellows become rigid.
9. The bellows structure 10 is a physical barrier which prevents liquid, vapour and/or particulate contamination from entering the IACV. This contamination exclusion will extend the warranty/durability life of the IACV.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bellows assembly for an idle air control valve of a vehicle, the bellows assembly comprising:

a bellows structure having a first end defining a base, a second, opened end, and a bellows between the first and second ends, the bellows structure including an internal annular rim member associated with the second opened end thereof, and a pintle having external surfaces defining an annular groove therein, the annular rim member of the bellows structure being received in the annular groove thereby coupling the bellows structure with the pintle.

2. The assembly of claim 1, wherein the bellows structure is of epichlorohydrin material having a durometer of about 70.

3. The assembly of claim 1, wherein the annular rim member and the annular groove are in press-fit engagement.

4. The assembly of claim 1, wherein the pintle includes a first portion received within an internal portion of the bellows structure and a second portion extending outside of the internal portion of the bellows structure.

5. The assembly of claim 1, wherein the bellows defines a generally cylindrical interior space.

6. The assembly of claim 5, further comprising a coil spring disposed within the interior space and biasing the pintle.

7. The assembly of claim 1, in combination with an idle air control valve of a vehicle, the idle air control valve having a housing, the housing including a recess, the base of the bellows structure being in press-fit engagement with the recess.

8. The combination of claim 7, wherein the pintle is engaged with a linearly movable shaft of a motor of the idle air control valve, with the bellows completely surrounding an entire portion of the shaft that is not engaged with the pintle so that the bellows together with the pintle provide a barrier substantially preventing contaminants from entering the motor.

9. The combination of claim 8, further comprising a coil spring biasing the pintle in an extended position of the shaft, the bellows surrounding the shaft and the coil spring.

10. The combination of claim 8, wherein the motor is a stepper motor.

11. An idle air control valve for a vehicle, the idle air control valve comprising:

a housing, a motor disposed in the housing, a shaft associated with the motor such that operation of the motor causes linear motion of the shaft, and a bellows assembly comprising:

a bellows structure having a first end defining a base, a second, opened end, and a bellows between the first and second ends, the bellows structure including an internal annular rim member associated with the second opened end thereof, and a pintle having external surfaces defining an annular groove therein, the annular rim member of the bellows structure being received, in press-fit engagement, in the annular groove, thereby coupling the bellows structure with the pintle, wherein the base of the bellows is in press-fit engagement with a recess defined in the housing and the pintle is coupled with an end of the shaft, with the bellows structure together with the pintle surrounding the shaft and providing a barrier substantially preventing contaminants from entering the motor.

12. The idle air control valve assembly of claim 11, wherein the bellows structure is of epichlorohydrin material having a durometer of about 70.

13. The idle air control valve of claim 11, wherein the pintle includes a first portion received within an internal portion of the bellows structure and a second portion extending outside of the internal portion of the bellows structure.

14. The idle air control valve of claim 11, wherein the bellows defines a generally cylindrical interior space.

15. The idle air control valve of claim 14, further comprising a coil spring biasing the pintle in an extended position of the shaft, the bellows surrounding the shaft and the coil spring.

16. A method of providing a contaminant barrier for an idle air control valve of a vehicle, the idle air control valve including a housing, a motor disposed in the housing, a shaft associated with the motor such that operation of the motor causes linear motion of the shaft, the method comprising:

providing a bellows structure having a first end defining a base, a second, opened end, and a bellows between the first and second ends, the bellows structure including an internal annular rim member associated with the second opened end thereof, providing a pintle having external surfaces defining an annular groove therein, sliding the second end of the bellows structure over a portion of the pintle so that the annular rim member of the bellows structure is received, in press-fit engagement, in the annular groove, thereby coupling the bellows structure with the pintle, and coupling the pintle to an end of the shaft, and press-fitting the base of the bellows structure into a recess in the housing, with the bellows together with the pintle surrounding the shaft and providing a barrier substantially preventing contaminants from entering the motor.

17. The method of claim 16, wherein the step of providing the bellows, includes defining a generally cylindrical interior space in the bellows.

18. The method of claim 17, further comprising:

providing a coil spring that biases the pintle in an extended position of the shaft, the bellows surrounding the shaft and the coil spring.

19. The method of claim 16, wherein the step of providing the bellows structure includes providing the bellows structure of epichlorohydrin material having a durometer of about 70.

* * * * *